US005432228A

United States Patent [19]

Hilken et al.

[11] Patent Number: 5,432,228

[45] Date of Patent: Jul. 11, 1995

[54] AQUEOUS SOLUTIONS AND DISPERSIONS OF POLYISOCYANATE POLYADDITION PRODUCTS, A PROCESS FOR THE PRODUCTION OF THE AQUEOUS SOLUTIONS AND DISPERSIONS AND THEIR USE AS ADHESIVES

[75] Inventors: Gënter Hilken, Cologne; Wolfgang Henning, Kuerten; Walter Meckel, Neuss; Rudolf Hombach, Leverkusen, all of Germany

[73] Assignee: Bayer Aktiengesellschaft, Leverkusen, Germany

[21] Appl. No.: 483,167

[22] Filed: Feb. 21, 1990

Related U.S. Application Data

[63] Continuation of Ser. No. 231,516, Aug. 11, 1988, abandoned.

[30] Foreign Application Priority Data

Aug. 22, 1987 [DE] Germany ........................ 37 28 140.2

[51] Int. Cl.[6] .......................... C08J 3/00; C08K 3/20; C08L 75/00; C09J 4/00

[52] U.S. Cl. .................................... 524/591; 524/839; 524/840; 156/331.7; 428/423.1

[58] Field of Search ............... 524/591, 839, 840, 591; 156/331.7; 428/423.1

[56] References Cited

U.S. PATENT DOCUMENTS

| | | | |
|---|---|---|---|
| 4,303,774 | 12/1981 | Nachtkamp et al. | 528/71 |
| 4,408,008 | 10/1983 | Markusch | 524/591 |
| 4,663,377 | 5/1987 | Hombach et al. | 524/196 |
| 4,701,480 | 10/1987 | Markusch | 524/840 |
| 4,764,553 | 8/1988 | Mosbach | 524/840 |
| 4,801,644 | 1/1989 | Coogan | 524/840 |
| 4,870,129 | 9/1989 | Henning et al. | 524/597 |

FOREIGN PATENT DOCUMENTS

| | | |
|---|---|---|
| 0148970 | 7/1985 | European Pat. Off. . |
| 2804609 | 8/1979 | Germany . |

*Primary Examiner*—Paul R. Michl
*Assistant Examiner*—Patrick Niland
*Attorney, Agent, or Firm*—Joseph C. Gil; Thomas W. Roy

[57] ABSTRACT

Aqueous solutions and dispersions of polyisocyanate polyaddition products containing 2 to 200 milliequivalents chemically incorporated carboxylate and/or sulfonate groups per 100 g solids and 0 to 25% by weight, based on solids, of incorporated ethylene oxide units arranged within terminal and/or lateral polyether chains, in the production of which primary and/or secondary monoamino compounds are usd, a process for their production and their use as adhesives.

5 Claims, No Drawings

AQUEOUS SOLUTIONS AND DISPERSIONS OF POLYISOCYANATE POLYADDITION PRODUCTS, A PROCESS FOR THE PRODUCTION OF THE AQUEOUS SOLUTIONS AND DISPERSIONS AND THEIR USE AS ADHESIVES

This application is a continuation of application Ser. No. 07/231,516 filed Aug. 11, 1988, now abandoned.

This invention relates to aqueous solutions and dispersions of special polyisocyanate polyaddition products which are eminently suitable for use as adhesives, to a process for their production and to their use as adhesives.

Aqueous solutions and dispersions of polyisocyanate polyaddition products, i.e. aqueous solutions and aqueous dispersions of polyurethanes and of polyurethane polyureas, are known. Their production is described, for example, in DE-PS 880 485, DE-AS 1 044 404, US-PS 3,036,998, DE-PS 1 178 586, DE-PS 1 134 946, DE-AS 1 237 306, DE-OS 1 595 602, US-PS 3,756,992, DE-OS 2 019 324, DE-OS 2 035 732, DE-OS 2 446 440, US-PS 3,479,310 and Angewandte Chemie 82, 35 (1970).

Where dispersions of the tpe in question are used for bonding non-absorbent materials, such as for example rubber, metal, flexible PVC, the heat activation process is adopted in order to avoid any inclusion of water. In this process, the dispersion is applied to the substrate and, after complete evaporation of the water, the layer of adhesive is converted into a tacky state.

A major disadvantage of the dispersions known from the prior art cited above is that the temperature required to activate the adhesive layer is so high that the substrate is often damaged. For example, molded soles of thermoplastic rubber cannot be satisfactorily bonded with polyurethane dispersions of the type available at the present time because the sole material undergoes deformation at the high temperatures required to activate the adhesive layer.

Efforts to lower the activation temperature by addition of solvents, plasticizers or resins have resulted in an undesirable reduction in the heat resistance of the bonds.

Although the use of polyurethane dispersions, which have been prepared using aliphatic diisocyanates in the production of the polyurethanes, as adhesives as described in DE-OS 28 04 609 leads to readily activatable adhesive layers, these dispersions dry in flaky form, i.e. non-coherently, rather than homogeneously at room temperature. This results in a considerable reduction in bond strength, particularly in the event of prolonged exposure to moisture.

DE-OS 3 630 045 describes an adhesive based on a polyurethane dispersion, the polyurethane having been produced using a mixture of at least two aliphatic and/or cycloaliphatic diisocyanates.

Adhesive films freshly prepared from this dispersion are readily activatable. However, when components laminated with this adhesive are kept in storage, as is standard practice in industrial manufacturing processes, these films lose their ready activatability after only a few hours.

Accordingly, there is a need for new solutions and dispersions of polyisocyanate polyaddition products which are more suitable as adhesives than the prior-art solutions or dispersions.

The present invention relates to aqueous solutions and aqueous dispersions of polyisocyanate polyaddition products containing 2 to 200 milliequivalents of chemically incorporated carboxylate and/or sulfonate groups per 100 g solids and 0 to 25% by weight, based on solids, of ethylene oxide units incorporated within terminal and/or lateral polyether chains, in the production of which primary and/or secondary monoamino compounds are used. In particular, NCO prepolymers may be reacted with a mixture of diamino and monoamino compounds.

The present invention also relates to a process for the production of aqueous solutions and aqueous dispersions of polyisocyanate polyaddition products by reaction of a) organic polyisocyanates, optionally together with small quantities of organic monoisocyanates, with b) organic polyhydroxyl compounds having a molecular weight in the range from 500 to 6000, c) optionally polyhydric alcohols and/or aminoalcohols having a molecular weight in the range from 61 to 499 in a quantity of 0 to 75 hydroxyl/amine equivalent-%, based on the total quantity of components b) and c) and d) optionally monohydric alcohols comprising ethylene oxide units incorporated within polyether chains, maintaining an NCO:OH equivalent ratio of 1.2:1 to 2.5:1, and subsequent reaction of the resulting prepolymers containing isocyanate groups with e) aminic compounds, i) components b), c) and/or e) at least partly containing incorporated sulfonate and/or carboxylate groups or acid groups convertible into sulfonate and/or carboxylate groups by neutralization so that the polyisocyanate polyaddition products, optionally after optionally at least partial neutralization of the potential ionic groups mentioned, contain 2 to 200 milliequivalents chemically incorporated carboxylate and/or sulfonate groups per 100 g solids, ii) organic dihydroxy compounds containing lateral ethylene oxide units present within polyether chains as components b) and/or c) and/or component b) optionally being used in such quantities that the polyisocyanate polyaddition products contain from 0 to 25% by weight, based on solids, of ethylene oxide units present within terminal and/or lateral polyether chains and iii) the polyisocyanate polyaddition products being prepared by reaction of the isocyanate prepolymers with component e) in aqueous and/or organic medium, characterized in that primary and/or secondary monoamino compounds, optionally in admixture with primary or secondary diamino compounds, are used as component e). A mixture of di- and monoamino compound is preferably used.

In the content of the invention, the expression "polyurethane" also encompasses polyurethane polyureas, i.e. high molecular weight compounds which, in addition to urethane groups, also contain urea groups.

Organic polyisocyanates suitable as starting materials a) for the process according to the invention are any organic compounds which contain at least two free isocyanate groups. Preferred organic polyisocyanates are diisocyanates $X(NCO)_2$, where X is an aliphatic $C_4$–$C_{12}$ hydrocarbon radical, a cycloaliphatic $C_6$–$C_{15}$ hydrocarbon radical, an aromatic $C_6$–$C_{15}$ hydrocarbon radical or an araliphatic $C_7$–$C_{15}$ hydrocarbon radical.

Examples of preferred diisocyanates such as these are tetramethylene diisocyanate, hexamethylene diisocyanate, dodecamethylene diisocyanate, 1,4-diisocyanatocyclohexane, 1-isocyanato-3,3,5-trimethyl-5-isocyanatomethylenecyclohexane (isophorondiamine), 4,4'-diisocyanatodicyclohexylmethane, 4,4'-diisocyantodicyclohexyl-2,2-propane, 1,4-diisocyanatobenzene, 2,4-diisocyantotoluene, 2,4-diisocyanatodiphenylmethane, 2,6-diisocyanatotoluene, 4,4'-diisocyanatodiphenylmethane, p-xylylene diisocyanate and mixtures of these compounds.

It is of course also possible partly to (co)-use the higher polyisocyanates known per se in polyurethane chemistry or even modified polyisocyanates known per se, for example polyisocyanates containing carbodiimide groups, allophanate groups, isocyanurate groups, urethane groups and/or biuret groups.

Reactants for the polyisocyanates a) are b) organic polyhydroxyl compounds having a molecular weight in the range from 500 to 6,000, preferably polyester polyols, optionally c) polyhydric alcohols, polyhydro- and/or aminoalcohols having a molecular weight in the range from 61 to 499, optionally d) monohydric alcohols containing ethylene oxide units incorporated within polyether chains and having a molecular weight in the range from 800 to 10,000 and e) aminic chain-extending agents.

Component b) may preferably contain polyester polyols having a molecular weight in the range from 500 to 6000 of the type known from polyurethane chemistry, for example reaction products of polyhydric, preferably dihydric and, optionally, even trihydric alcohols with polybasic, preferably dibasic carboxylic acids. Instead of the polycarboxylic acids, it is also possible to use the corresponding polycarboxylic anhydrides or corresponding polycarboxylic acid esters of lower alcohols or mixtures thereof for the preparation of the polyesters. The polycarboxylic acids may be aliphatic, cycloaliphatic, aromatic and/or heterocyclic and may optionally be substituted, for example by halogen atoms, and/or unsaturated. Examples of such polycarboxylic acids are succinic acid, adipic acid, suberic acid, azelaic acid, sebacic acid, phthalic acid, isophthalic acid, trimellitic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimeric and trimeric fatty acids, such as oleic acids, optionally in admixture with monomeric fatty acids, terephthalic acid dimethyl ester, terephthalic acid-bis-glycol ester.

Suitable polyhydric alcohols are, for example, ethylene glycol, propylene-1,2- and -1,3-glycol, butylene-1,4-, -1,3- and -2,3-glycol, hexane-1,6-diol, octane-1,8-diol, neopentyl glycol, cyclohexanedimethanol (1,4-bis-hydroxymethylcyclohexane), 2-methylpropane-1,3-diol, glycerol, trimethylolpropane, hexane-1,2,6-triol, butane-1,2,4-triol, also diethylene glycol, triethylene glycol, tetraethylene glycol, polyethylene glycol, dipropylene glycol, polypropylene glycol, dibutylene glycol and polybutylene glycol. The polyesters may also contain terminal carboxyl groups. Polyesters of lactones may also be used.

The particularly preferred polyester polyols, particularly polyester diols, are dicarboxylic acid polyester polyols, in which at least 50 carboxyl equipvalent-% of the dicarboxylic acid component and preferably the entire dicarboxylic acid component consists of adipic acid and in which preferably at least 50 hydroxyl equivalent-% of the polyol component and more preferably the entire polyol component consists of 1,4-dihydroxybutane and 1,6-dihydroxyhexane.

Polycarbonates containing hydroxyl groups are also suitable as component b) or as a constituent of component b), for example hydroxyl polycarbonates of the type obtainable by reaction of diols, such as propane-1,3-diol, butane-1,4-diol and/or hexane-1,6-diol, diethylene glycol, triethylene glycol, tetraethylene glycol, with dicarbonates, for example diphenyl carbonate, or phosgene. Mixtures of the polyhydroxyl compounds mentioned by way of example above may also be used as component b).

The components c) optionally used in the process according to the invention are organic polyhydroxyl compounds (preferably containing 2 to 3 hydroxyl groups) and aminoalcohols having a molecular weight in the range from 61 to 49 and preferably in the range from 61 to 250. These compounds are generally used in a quantity of 0 to 75 hydroxyl or amine equivalent-%, based on the total quantity of components b) and c). These components c) are nitrogen-free polyols optionally containing ether or ester groups and aminoalcohols.

The components c) mentioned first include, for example, a simple polyhydric alcohols, such as ethylene glycol, propylene glycol, propane-1,3-diol, butane-1,4-diol, hexane-1,6-diol, trimethylol propane and glycerol.

Low molecular weight polyester diols, such as adipic acid-bis-(hydroxyethyl)-ester, and low molecular weight diols containing ether groups, such as diethylene glycol, triethylene glycol, tetraethylene glycol, propoxylated 4,4'-(bishydroxyphenyl)-2,2-propane, dipropylene glycol, tripropylene glycol or tetrapropylene glycol, may also be co-used as component c).

Suitable aminoalcohols are, for example, ethanolamine, propanolamine, N-methyldiethanolamine, N-methyl-diisopropanolamine, N-ethyldiethyleneamine, N-dethyl-diisopropanolamine and N,N'-bis-(2-hydroxyethyl)-perhydropyrazine.

Mixtures of the compounds mentioned here by way of example may also be used as component c).

Diols comprising natural polyether chains, of which at least 40 mol-% and preferably at least 65 mol-% consists of ethylene oxide units and the remainder of propylene oxide units, may also be used as part of components b) and/or c) (depending on the molecular weight). Nonionic, hydrophilic synthesis components such as these are described, for example, in US-PS 3,905,929 and in US-PS 4,190,566.

Suitable components d) which may optionally be used in accordance with the invention are monohydric polyether alcohols having a molecular weight in the range from 800 to 10,000 and preferably in the range from 1,000 to 5,000, which may be obtained by alkoxylation of monofunctional starter molecules, such as for example methanol, ethanol, n-butanol or phenol, ethylene oxide or mixtures of ethylene oxide with other alkylene oxides, such as in particular propylene oxide, being used as the alkoxylating agent.

Where alkylene oxide mixtures are used, however, they contain at least 40 mol-% and preferably at least 65 mol-% ethylene oxide. The optional components d) are co-used to incorporate hydrophilic ethylene oxide units incorporated within polyether chains in the products obtained by the process according to the invention.

According to the invention, component e) consists of primary and/or secondary monoamines or of mixtures of such monoamines with primary and/or secondary diamines. The average aminofunctionality of component e) is between 1 and 1,9, preferably 1,7.

It is preferred to use mixtures of monoamines and diamines of which the average aminofunctionality is between 1,1 and 1,9. Component e) is preferably used in such a quantity that the equivalent ratio of NCO groups in the NCO prepolymer to NCO-reactive amino groups is between 1:1 and 2.5:1, more preferably between 1:1 and 1.5:1 and most preferably between 1.05:1 and 1.4:1, while the equivalent ratio of NCO groups in the NCO prepolymer to the total quantity of isocyanate-reactive hydrogen atoms in e) is between 0.5:1 and 0.98:1 and more preferably between 0.6:1 and 0.9:1.

The expression "diamino compounds" or "diamines" is also intended to encompass hydrazine and hydrazine derivatives containing two isocyanate-reactive amino groups. Suitable diamines are those having a molecular weight in the range from 32 to 500 and preferably in the range from 60 to 300, such as for example ethylenediamine, hexamethylenediamine, isophorondiamine, 2,4-diaminotoluene, 4,4'-diaminodiphenylmethane, N,N'-dimethyl ethylenediamine, 4,4'-diaminocyclohexylmethane, piperazine, 2,5-dimethyl piperazine, 1,4-diaminocyclohexane, 1,2-diaminopropane, hydrazine (hydrate), diaminosulfonates of the type described in CA-PS 928,323 or the sodium salt of N-(2-aminoethyl)-2-aminopropionic acid.

The expression "monoamino compounds" or the expression "monoamine" is also intended to encompass ammonia. Suitable monoamino compounds are any organic compounds containing a primary or secondary amino group or ammonia. The molecular weight of the monoamino compounds is in the range from 17 to 500 and preferably in the range from 17 to 300. The monoamines may also contain other isocyanate-reactive groups, particularly hydroxyl groups. This means that aminoalcohols of the type already mentioned by way of example in the foregoing may also be used inter alia as component e) or as part of component e). Typical examples of suitabl monoamino compounds are ammonia, ethylamine, n-butylamine, di-n-butylamine, N-methylethanolamine, diethanolamine, 3-amino-1-propanol, 2-(3-aminopropyl)-methylaminoethanol, 2-amino-2-hydroxymethylpropane-1,3-diol or N-methyl- or -aminoacetic acid and salts thereof or ammonia.

Primary and/or secondary amino compounds of the type containing other, but not aminic, isocyanate-reactive groups are particularly preferred. Examples of such compounds are ethanolamine, diethanolamine or 2-amino-2-hydroxymethylpropane-1,3-diol.

The aminic components e) may also be used in blocked form in the process, i.e. in the form of the corresponding ketimines (DE-OS 2 725 589), ketazines (DE-OS 2 811 148, U.S. Pat. No. 4,269,748) or amine salts (U.S. Pat. No. 4,292,226).

Oxazolidines of the type used, for example, in accordance with DE-OS 2 732 131 or U.S. Pat. No. 4,192,937 are also masked amines which may be used in the process according to the invention, as in the cited publications, as chain-extending agents for the NCO prepolymers. Where masked amines such as these are used, they are generally mixed with the NCO prepolymers in the absence of water and the resulting mixture subsequently mixed with the dispersion water or with part of the dispersion water, so that the corresponding amines are intermediately released by hydrolysis.

The polyurethane on which the solutions and dispersions according to the invention are based contains from 2 to 200 and preferably from 2 to 150 and more preferably from 5 to 100 milliequivalents carboxylate and/or sulfonate groups per 100 g solids.

Ionic centers such as these are incorporated in known manner by the co-use of components containing ionic groups (carboxylate and/or sulfonate groups), where compounds containing "potential" ionic groups of the type mentioned are used, the potential ionic groups are at least partly converted into the corresponding ionic groups before or during mixing of the polyurethane with the water used to prepare the solution or dispersion, for example using tertiary amines, such as triethylamine for example, or inorganic bases, such as sodium hydroxide for example.

Anionic or "potentially" anionic components include, for example, the aliphatic diols containing sulfonate groups according to DE-OS 2 446 440 or DE-OS 2 437 218, diols containing carboxylate groups or carboxyl groups convertible into carboxylate groups and/or diaminosulfonates of the type described in CA-PS 928,323, such as for example the sodium salt of N-(2-aminoethyl)-2-aminoethanesulfonic acid, dimethyl propionic acid or salts thereof, for example the corresponding triethyl ammonium salts or the sodium salt of N-(2-aminoethyl)-3-aminopropionic acid. Depending on the nature of the isocyanate-reactive groups (hydroxyl or amino groups) and on the molecular weight of these (potentially) anionic synthesis components, these synthesis components represent part of component b) [(potentially) anionic polyhydroxyl compounds of components c) ((potentially) anionic low molecular weight polyhydroxyl compounds] or components e) (mixture of monoamino and diamine compound). In the preparation of the polyurethanes, it is largely immaterial whether the ionic groups are incorporated through the co-use of corresponding synthesis components b), c) and/or e).

As already mentioned, the polyurethane on which the adhesive according to the invention is based may optionally contain up to 25% by weight and preferably up to 15% by weight, based on solids, of ethylene oxide units present in incorporated terminal and/or lateral polyether chains.

Compounds of the type in question may be prepared by the methods according to U.S. Pat. Nos. 3,905,929 or 4,190,566. Depending on their molecular weight, these hydrophilic synthesis components may be assigned to group b) (molecular weight at least 500) or c) (molecular weight below 500).

In the preparation of the polyurethanes, the total quantity of hydrophilic centers (anionic groups and optionally terminal and/or lateral polyether chains containing incorporated polyethylene oxide units) is always gauged in such a way as to guarantee the solubility or dispersibility of the polyurethanes in water. Although possible in principle, it is preferred not to use external emulsifiers. Examples of emulsifiers which may optionally be co-used are ethoxylated nonylphenol, polyoxyethylene lauryl ether or polyoxyethylene laurate, oleate or stearate, these additives generally containing 8 to 150 polyoxyethylene units per molecule. If such external emulsifiers are used, they may be added to the polyurethanes or NCO prepolymers to be dispersed before the dispersion step.

Solvents may optionally be used in the preparation of the polyurethane. The solvents in question are preferably organic solvents, such as for example benzene, toluene, ethyl acetate, acetone, methylethylketone, diethylether, tetrahydrofuran, methyl acetate, acetonitrile, chloroform, methylene chloride, carbon tetrachloride, 1,2-dichloroethane, 1,1,2-trichloroethane, tetrachloroethylene or N-methyl pyrrolidone. It is preferred to use water-miscible solvents, particularly acetone.

The polyurethanes are prepared by the well-known methods used for the preparation of aqueous polyurethane dispersions or solutions. This means that either the polyurethane molecule is synthesized at least partly in the presence of water, so that an aqueous solution or dispersion is directly obtained, or that the process according to the invention is carried out in the absence of water until the synthesis of the macromolecules is over, after which the polyurethane is converted into an aqueous solution or dispersion.

The preparation of the solutions and dispersions according to the invention by the process according to the invention is preferably carried out by one of the following variants:

1. by the "acetone process" [by analogy with the teaching of DE-OS 1 495 745 (U.S. Pat. No. 3,479,310) or DE-OS 1 495 847 (GB-PS 1,076,788)];

2. another embodiment of the preparation of the aqueous polyurethane dispersion corresponds to the processes known from DE-OS 2 725 589, U.S. Pat. Nos. 4,269,748, 4,192,937 or 4,292,226 (these processes for the preparation of the polyurethane dispersion may also be modified in accordance with the teaching of U.S. Pat. Nos. 4,192,937 or in accordance with the teaching of 4,929,226);

3. basically, it is also possible to prepare aqueous polyurethane solutions or dispersions of the type present in the adhesives according to the invention by the method according to U.S. Pat. No. 3,756,992, i.e. by the "melt dispersion process".

In a particularly preferred embodiment, the polyurethane solutions or dispersions are prepared by the method mentioned above under 1. In the preparation of the aqueous polyurethane dispersions or solutions, the quantity of water used is gauged in such a way that 10 to 60% by weight and preferably 20 to 50% by weight solutions or dispersions of the polyurethanes are obtained. The usual auxiliaries and additives of the type described, for example, in U.S. Pat. No. 3,479,310, column 8, line 40, column 9, line 10, may be added to the solutions or dispersions.

Polyisocyanate compounds containing at least two free isocyanate groups are preferably added to the solutions and dispersions according to the invention before they are used. It is particularly preferred to use polyisocyanate compounds which can be emulsified in water, such as for example the compounds described in EP 206 059 and DE-OS 3 112 117.

The polyisocyanate compounds are used in a quantity of 0.1 to 20% by weight, preferably in a quantity of 0.5 to 10% by weight and more preferably in a quantity of 1.5 to 6% by weight, based on solution or dispersion. An addition such as this provides for a considerable improvement in the heat resistance of bonds formed with the solutions and dispersions according to the invention.

The adhesives according to the invention consisting essentially of the described polyurethane solutions or dispersions and optionally containing additives of the type mentioned by way of example are suitable for the bonding of any substrates such as, for example, paper, cardboard, wood, metals or leather, but are particularly suitable for the bonding of rubber materials, plastics, including polyurethane foams having a compact surface and—providing the reaction mixtures for the preparation of the polyurethanes corresponds in its particular compositions to DE-PS 1 256 822—for the bonding of plasticized homopolymers or copolymers of vinyl chloride, but above all for the bonding of soles of these materials and shoe uppers of leather and artificial leather.

The adhesive according to the invention is applied by the known methods of adhesives technology for applying aqueous dispersion or solution adhesives.

The invention is further illustrated by the following examples in which "milliequivalent percent" means milliequivalents per 100 g solids.

EXAMPLES

EXAMPLE 1

| Reaction mixture: | | |
|---|---|---|
| 360.0 | g | of a polyester of adipic acid and butanedial (OH value 50) (PE) |
| 23.35 | g | of hexamethylene diisocyanate (H) |
| 15.3 | g | of isophorone diisocyanate (IPDI) |
| 800 | g | of acetone |
| 12.9 | g | of sodium salt of N-(2-aminoethyl)-2-aminoethanesulfonic acid (45% in water) (AAS salt) |
| 2.1 | g | of diethanolamine |
| 565 | g | of water |

Method

The polyester (PE) is dehydrated in vacuo at 120° C. for 30 minutes with stirring and then cooled to 80° C. After the addition of H and IPDI, stirring is continued at 80° C. until a constant isocyanate value of from 0.9 to 1.01% is reached. Acetone is slowly added while the temperature is kept at 50° C. A solution of AAS salt and diethanolamine in 50 g water is stirred into the homogeneous acetone solution at 50° C. After 7 minutes, the reaction mixture is dispersed with water and the acetone is then immediately distilled off.

A finely divided dispersion having a solids content of 40.2% and a pH value of 7.9 is obtained. Mean particle size 111 nm (laser correlation spectroscopy). NCO:NH=1.2; NCO:NH+OH=0.8.

COMPARISON EXAMPLE 2 a

Starting materials

| | | |
|---|---|---|
| 337.50 | g | of an adipic acid-tetramethylenediol polyester (OH number 50) (PE) |
| 1.34 | g | of dimethylolpropionic acid (DMPA) |
| 26.87 | g | of 1,6-diisocyanatohexane (H) |
| 17.76 | g | of IPDI |
| 800.00 | g | of acetone |
| 14.04 | g | of sodium salt of N-(2-aminoethyl)-2-aminoethane sulphonic acid (45% in water) (AAS salt) |
| 0.78 | g | of ethylene diamine (ADA) |
| 557.00 | g | of water. |

NCO/NH ratio for the chain lengthening reaction: 1:0.7

Method

The polyester is dehydrated in a vacuum at 120° C. for 30 minutes with stirring and cooled to 85° C. DMPA is stirred in and H and IPDI are added after 5 minutes. Stirring is continued at 85° C. until the isocyanate value remains constant at 1.58%. Acetone is slowly added while the temperature is maintained at 50° C. The isocyanate value of the acetonic solution is 0.47%. A solution of AAS and ADA in 28 g of water is stirred into the homogeneous acetonic solution at 50° C. After 5 minutes, the product is dispersed with water and the acetone is then immediately distilled off.

A finely divided dispersion having a solids content of 42.9%, a Ford cup viscosity (4 mm nozzle) of 13.8 sec. and a pH of 5.5 is obtained.

COMPARISON EXAMPLE 2b

Starting materials

| | | |
|---|---|---|
| 337.50 | g | of an adipic acid-tetramethylenediol polyester (OH number 50) (PE) |
| 2.03 | g | of dimethylolpropionic acid (DMPA) |
| 25.09 | g | of 1,6-diisocyanatohexane (H) |
| 16.54 | g | of IPDI |
| 835.00 | g | of acetone |
| 18.17 | g | of the sodium salt of N-(2-aminoethyl)-2-aminoethane sulphonic acid (45% in water) (AAS salt) |
| 1.58 | g | of triethylanine (TEA) |
| 619.00 | g | of water |

NCO/NH ratio: 1:0.83

Method

The prepolymer is prepared as in Example 2a and dissolved in acetone. The product is lengthened with AAS at 50° C. and converted into a salt by reaction with TEA after 5 minutes and then dispersed in water after a further 5 minutes. The acetone is distilled off immediately thereafter. A finely divided dispersion having a solids content of 41.7%, a Ford cup viscosity (4 mm nozzle) of 20.8 sec and a pH of 6 is obtained.

COMPARISON EXAMPLE 2c

Starting materials:

| | | |
|---|---|---|
| 337.50 | g | of an adipic acid-tetramethylenediol polyester (OH number 50) (PE) |
| 1.34 | g | of dimethylolpropionic acid (DMPA) |
| 36.29 | g | of 1,6-diisocyanatohexane (H) |
| 5.33 | g | of IPDI |
| 800.00 | g | of acetone |
| 19.00 | g | of the sodium salt of N-(2-aminoethyl)-2-aminoethane sulphonic acid (45% in water) (AAS salt) |
| 0.50 | g | of ethylenediamine (ADA) |
| 580.00 | g | of water |

NCO/NH ratio: 1:0.8

Method

See Example 2a

A finely divided dispersion having a solids content of 45.7%, a Ford cup viscosity (4 mm nozzle) of 22.3% and a pH of 6 is obtained.

COMPARISON EXAMPLE 2d

Starting materials:

| | | |
|---|---|---|
| 337.50 | g | of an adipic acid-tetramethylenediol polyester (OH number 50) (PE) |
| 1.34 | g | of dimethylolpropionic acid (DMPA) |
| 4.03 | g | of hexamethylenediisocyanate (H) |
| 47.95 | g | of IPDI |
| 800.00 | g | of acetone |
| 13.17 | g | of the sodium salt of N-(2-aminoethyl)-2-aminoethane sulphonic acid (45% in water) (AAS salt) |
| 0.36 | | of ethylenediamine (ADA) |
| 540.00 | g | of water |

NCO/NH ratio: 1:0.8

Method

See Example 2a

A finely divided dispersion having a solids content of 41%, a Ford cup viscosity (4 mm nozzle) of 12.4 sec and a pH of 6 is obtained.

Bonds were formed using the dispersions described above. The material bonded was a 4 mm thick transparent PVC material containing 30% dioctylphthalate as plasticizer. Before the dispersion was applied, the surface to be bonded were rubbed thoroughly with No. 40 abrasive tape. After the materials had been freed from abrasion dust, they were coated with a 0.1 mm thick layer of adhesive and left to air for about 30 minutes at room temperature.

Determination of the Activation Temperature

To determine the activation temperature, 1 cm wide sample strips were stored at the desired temperature in a drying carbinet. After the periods of time shown in Table 1, two adhesive strips were placed together under light finger pressure to form an overlapping area of 1×1 cm. A bond was judged to be satisfactory when coalescence between the two surfaces occurred over the whole area under these conditions and the bond could only be separated by clear application of force immediately after it had been formed. The temperature required for this purpose are shown in Table 1.

TABLE 1

Activation temperatures in 0° C.

| Example | Immediately | Activation temperature After 3 h | After 5 h | After 24 h |
|---|---|---|---|---|
| 1 | 40 | 40 | 40 | 40–45 |
| 2a | 45 | 50 | 70–75 | >90 |
| 2b | 40 | 50–55 | 70–75 | >90 |
| 2c | 40 | 55 | 70–75 | >90 |
| 2d | 45 | 50 | 70 | >90 |

EXAMPLE 3

An adhesive mixture was prepared by stirring 3 g of emulsifiable isocyanate (KA 8365, Bayer AG) into 100 g of the dispersion according to Example 1.

Heat resistance test 2.5 cm wide strips of the flexible PVC mentioned above were coated with a 0.1 mm thick layer of adhesive obtained from the dispersion of Example 1 and the adhesive mixture of Example 3.

After stirring for 5 hours, the adhesive surfaces (Examples 1 and 3) were heated to a temperature of 50° C. by radiant heat in 4 seconds. The adhesive strips were then placed together to form an overlapping area of 2.5×2.5 cm. The test specimens were then pressed together for 10 seconds under a pressure of 0.4 mPa.

To determine heat resistance, the test specimens were subjected to a shearing test after storage for 3 days at room temperature. In this shearing test, the samples are placed under a load of 11 kg. After conditioning for 20 minutes at 40° C., the temperature at which the bond fails is determined by raising the temperature by 0.25° C. per minute. The following temperature were reached:

Example 3: 88° C.

Example 1: 60° C.

We claim:

1. In a process for bonding substrates which comprises applying an adhesive to at least one of a pair of substrates, placing the substrates in contact with each other and heating the substrates to activate the adhesive, the improvement which comprises using as the adhesive an aqueous solution or dispersion of a polyurethane which comprises the polyisocyanate polyaddition reaction product of I) an isocyanate-terminated prepolymer prepared by reacting at an equivalent ratio of isocyanate groups to isocyanate-reactive groups of 1.2:1 to 2.5:1
   a) an organic polyisocyanate,
   b) an organic polyhydroxyl compound having a molecular weight of 500 to 6000,
   c) a polyhydric alcohol and/or aminoalcohol having a molecular weight of 61 to 499 in a quantity of 0 to 75 equivalent percent, based on the equivalents of isocyanate groups which remain after the reaction between components a) and b) and
   d) 0 to 25 weight percent, based on the weight of said polyisocyanate polyaddition product, of a monohydric alcohol containing ethylene oxide units present within polyether chains, with II) a component which contains
   e) a primary or secondary monoamino compound having at least one hydroxy group and an amount of a primary and/or secondary diamino compound which is sufficient to provide component II with an average amine functionality of 1 to 1.9, wherein at least a portion of at least one of components b), c) or e) contains sulfonate and/or carboxylate groups or groups convertible into sulfonate and/or carboxylate groups in an amount such that said 100 grams of said polyisocyanate polyaddition product contain about 2 to 200 milliequivalents of chemically incorporated sulfonate and/or carboxylate groups and wherein the equivalent ratio of isocyanate groups in component I to amino groups in component II is 1:1 to 1.5:1 and the equivalent ratio of isocyanate groups in component I to isocyanate-reactive groups in component II is 0.5:1 to 0.98:1.

2. The process of claim 1 which comprises mixing said adhesive with a polyisocyanate compound containing at least two unreacted isocyanate groups prior to applying said adhesive to a substrate.

3. A two-component composition which comprises

A) an aqueous solution or dispersion of a polyurethane which is the polyisocyanate polyaddition reaction product of
   I) an isocyanate-terminated prepolymer prepared by reacting at an equivalent ratio of isocyanate groups to isocyanate-reactive groups of 1.2:1 to 2.5:1
      a) an organic polyisocyanate selected from the group consisting of aliphatic diisocyanates containing 4 to 12 carbon atoms in the hydrocarbon radical, cycloaliphatic diisocyanates containing 6 to 15 carbon atoms in the hydrocarbon radical, araliphatic diisocyanates containing 7 to 15 carbon atoms in the hydrocarbon radical, 1,4-diisocyanatobenzene, 2,4-diisocyanatotoluene, 2,6-diisocyanatotoluene, 4,4'-diisocyanatodiphenylmethane, polyisocyanates prepared from one of the preceding diisocyanates and containing at least one of carbodiimide groups, allophanate groups, isocyanurate groups, urethane groups and biuret groups and mixtures of any of the preceding polyisocyanates,
      b) an organic polyhydroxyl compound having a molecular weight of 500 to 6000,
      c) a polyhydric alcohol and/or aminoalcohol having a molecular weight of 61 to 499 in a quantity of 0 to 75 equivalent percent, based on the equivalents of isocyanate groups which remain after the reaction between components a) and b) and
      d) 0 to 25 weight percent, based on the weight of said polyisocyanate polyaddition product, of a monohydric alcohol containing ethylene oxide units present within polyether chains, with
   II) a component which contains
      e) a primary or secondary monoamino compound having at least one hydroxy group and an amount of primary and/or secondary diamino compound which is sufficient to provide component II with an average amine functionality of 1 to 1, wherein at least a portion of at least one of components b), c) or e) contains sulfonate and/or carboxylate groups or groups convertible into sulfonate and/or carboxylate groups in an amount such that 100 grams of said polyisocyanate polyaddition product contain about 2 to 200 milliequivalents of chemically incorporated sulfonate and/or carboxylate groups and wherein the equivalent ratio of isocyanate groups in component I to amino groups in component II is 1:1 to 1.5:1 and the equivalent ratio of isocyanate groups in component I to isocyanate-reactive groups in component II is 0.5:1 to 0.98:1, and B) a polyisocyanate compound containing at least two unreacted isocyanate groups.

4. The composition of claim 3 wherein said polyisocyanate compound

B) is present in an amount of 0.5 to 10% by weight.

5. The composition of claim 3 wherein said polyisocyanate compound

B) is present in an amount of 1.5 to 6% by weight.

* * * * *